United States Patent
Kim et al.

(10) Patent No.: US 8,329,847 B2
(45) Date of Patent: Dec. 11, 2012

(54) OPTICALLY COMPENSATED ACRYLIC PRESSURE-SENSITIVE ADHESIVE COMPOSITION, POLARIZING PLATE AND LIQUID CRYSTAL DISPLAY DEVICE CONTAINING THE SAME

(75) Inventors: No-ma Kim, Daejeon (KR); In-Cheon Han, Seoul (KR); Jeong-Min Ha, Daejeon (KR); An-Na Lee, Daejeon-si (KR); Seung-Joon Park, Daejeon-si (KR); Suk-Ky Chang, Daejeon-si (KR)

(73) Assignee: LG Chem, Ltd., Seoul (KR)

( * ) Notice: Subject to any disclaimer, the term of this patent is extended or adjusted under 35 U.S.C. 154(b) by 285 days.

(21) Appl. No.: 12/309,397

(22) PCT Filed: Jul. 10, 2007

(86) PCT No.: PCT/KR2007/003327
§ 371 (c)(1),
(2), (4) Date: Nov. 18, 2009

(87) PCT Pub. No.: WO2008/010650
PCT Pub. Date: Jan. 24, 2008

(65) Prior Publication Data
US 2010/0068420 A1    Mar. 18, 2010

(30) Foreign Application Priority Data
Jul. 21, 2006    (KR) .................. 10-2006-0068559

(51) Int. Cl.
*C08F 18/16*    (2006.01)
(52) U.S. Cl. ........ 526/326; 428/1.1; 428/1.54; 428/354; 524/272; 524/560; 522/182; 526/319

(58) Field of Classification Search ............ 428/523, 428/1.1, 1.54, 354; 526/319, 326, 329.2; 522/167, 168, 172, 182; 525/100
See application file for complete search history.

(56) References Cited

U.S. PATENT DOCUMENTS

| | | | | |
|---|---|---|---|---|
| 3,222,419 A | * | 12/1965 | Jubilee et al. | 428/355 EP |
| 5,240,989 A | * | 8/1993 | Bernard et al. | 524/560 |
| 6,663,978 B1 | * | 12/2003 | Olson et al. | 428/523 |
| 2003/0103186 A1 | * | 6/2003 | Sasaki et al. | 349/194 |
| 2007/0055006 A1 | * | 3/2007 | Kim et al. | 524/556 |
| 2007/0117918 A1 | * | 5/2007 | Kim et al. | 524/556 |

* cited by examiner

*Primary Examiner* — Angela Ortiz
*Assistant Examiner* — Ruiyun Zhang
(74) *Attorney, Agent, or Firm* — McKenna Long & Aldridge, LLP

(57) ABSTRACT

The present invention relates to an acrylic pressure-sensitive adhesive composition which comprises a (meth)acrylic copolymer comprising 70 to 95 parts by weight of an alkyl (meth)acrylic acid ester monomer, in which alkyl has 2 to 14 carbon atoms, and 5 to 30 parts by weight of a (meth)acrylic acid ester monomer containing a copolymerizable aromatic group, wherein the composition has a gel fraction of 10 to 55% and a swelling ratio of 30 to 110, and a sol (uncrosslinked polymer) eluted therein with a solvent has a weight average molecular weight of 600,000 or more; a polarizing plate comprising the composition; and a liquid crystal display device comprising the same. The composition according to the present invention provides workability such as an excellent durability and re-workability, and has an effect of improving a light leakage phenomenon, since the size of birefringence occurred under stress is very small.

17 Claims, No Drawings

OPTICALLY COMPENSATED ACRYLIC PRESSURE-SENSITIVE ADHESIVE COMPOSITION, POLARIZING PLATE AND LIQUID CRYSTAL DISPLAY DEVICE CONTAINING THE SAME

This application is a 35 U.S.C. §371 National Stage entry of International Application No. PCT/KR2007/003327, filed on Jul. 10, 2007, and claims priority to Korean Application No. KR 10-2006-0068559, filed on Jul. 21, 2006, both of which are hereby incorporated by reference in their entireties.

TECHNICAL FIELD

The present invention relates to an acrylic pressure-sensitive adhesive composition for a polarizing plate. More specifically, the present invention relates to a pressure-sensitive adhesive composition for a polarizing plate having an excellent low light leakage property, without changing major properties under a high temperature and humidity such as durability and workability, and a polarizing plate and a liquid crystal display device, containing the same.

BACKGROUND ART

Generally, in preparing liquid crystal display devices, liquid crystal cells comprising liquid crystals and polarizing plates are basically required and suitable adhesive layers or pressure-sensitive adhesive layers have to be used for binding them. In addition, for improving functions of liquid crystal display devices, a phase retardation plate, a compensation plate for wide view angle, a brightness enhancement film, and the like may be used, with additionally adhered to the polarizing plate.

Major structure forming a liquid crystal display device comprises, generally, a uniformly aligned liquid crystal layer; a polarizing plate with a multi-layer structure, incorporated into a pressure-sensitive adhesive layer or an adhesive layer, based on a liquid crystal cell consisted of a clear glass plate or plastic sheet material containing an electrode layer; a phase retardation plate; and an additional functional film layer and the like.

The structure of polarizing plate is one comprising an iodine compound or a dichroic polarizing material aligned in a certain direction. To protect these polarizing elements, multi-layers are formed on both sides using a protective film such as triacetyl cellulose (TAC). In addition, the polarizing plate may additionally comprise a phase retardation film, or a compensation film for wide view angle such as a liquid crystal type film, in a shape having a unidirectional molecular alignment.

The aforementioned films are made of materials having different molecular structures and compositions, and so have different physical properties. Especially, under a high temperature and/or humidity condition, the dimensional stability according to shrinkage or expansion of materials having a unidirectional molecular alignment is insufficient. As a result, if the polarizing plate is fixed by a pressure-sensitive adhesive and shrunk or expanded under a high temperature and/or humidity condition, then stress is concentrated on the TAC layer, birefringence is developed and thereby a light leakage phenomenon occurs. In this case, a negative birefringence is usually caused.

Meanwhile, the pressure-sensitive adhesive layer needs high cohesion strength at high temperature to maintain the durability, for which partially cross-linked viscoelastic materials are used. When the partially cross-linked structure is introduced into the pressure-sensitive layer, the pressure-sensitive layer has the residual stress under the given stress and the polymer in the cross-linked structure is aligned in the specific direction to develop birefringence. Under such alignment, general acrylic pressure-sensitive adhesives develop negative birefringence.

Recently, monitor size of computers, and the like becomes larger, and the demand is rapidly increased for LCD TVs using polarizing plates. As such panels become larger, polarizing plates also become larger, and thereby the residual stresses of the TAC layer and the pressure-sensitive adhesive layer becomes higher and the magnitude of negative birefringence is extremely increased.

Among methods of minimizing light leakage under such residual stresses, a method adjusting zero birefringence under the residual stress is considered, by means of adding (blending) materials representing positive birefringence in the final pressure-sensitive adhesive layer under strain-induced stress or copolymerizing some special acrylic monomers, which shows positive birefringence under strain-induced stress.

KR laid-open patent publication No. 2003-0069461 discloses a method of compensating negative birefringence of acrylic pressure-sensitive adhesive layer under strain-induced stress by incorporating 0.01 to 40 parts by weight of low molecular weight organic molecules having a positive value of birefringence under the strain-induced residual stress into the acrylic pressure-sensitive adhesive layer. In such case, the modulus of pressure-sensitive adhesive may be lowered, due to use of the low molecular weight organic molecules incorporated into the pressure-sensitive adhesive layer and thus the tailoring property may be lowered on processing the polarizing plate. The low molecular weight organic molecules is more likely moved into the interface for long-term storage or caused the phase separation with the acrylic pressure-sensitive adhesive. In addition, $M_c$ (molecular weight between two cross-linking points) in the cross-linking structure is substantially increased, depending on the plasticizing effect due to the low molecular weight organic molecules. There is a problem that a large quantity of low molecular weight organic molecules should be introduced, since the increased $M_c$ reduces the residual stress and the alignment of low molecular weight organic molecules.

DISCLOSURE OF INVENTION

Technical Problem

The present invention is intended to solve the conventional problems above, and one object of the present invention is to provide an acrylic pressure-sensitive adhesive composition for polarizing plate improving the light leakage phenomenon by using (meth)acrylic copolymer copolymerized from (meth)acrylic ester monomer representing a positive birefringence and (meth)acrylic ester monomer representing a negative birefringence under the residual stress and regulating the birefringence within the specific range under the residual stress, without changing the major characteristics such as adhesive durability and reworkability which may be occurred under high temperature and humidity conditions.

Another object of the present invention is to provide a polarizing plate using the acrylic pressure-sensitive adhesive composition with said characteristics.

The other object of the present invention is to provide a liquid crystal display device comprising a polarizing plate prepared by the acrylic pressure-sensitive adhesive composition with said characteristics.

Technical Solution

The present invention relates to an acrylic pressure-sensitive adhesive composition which comprises a (meth)acrylic copolymer comprising 70 to 95 parts by weight of an alkyl (meth)acrylic acid ester monomer, in which alkyl has 2 to 14 carbon atoms, and 5 to 30 parts by weight of a (meth)acrylic acid ester monomer containing a copolymerizable aromatic group, wherein the composition has a gel fraction, represented by Equation 1, of 10 to 55% and a swelling ratio, represented by Equation 2, of 30 to 110, and a sol (uncross-linked polymer) eluted therein with a solvent has a weight average molecular weight of 600,000 or more.

$$\text{Gel fraction}(\%) = B/A \times 100 \quad (1)$$

$$\text{Swelling ratio} = C/B \quad (2)$$

wherein, A represents weight of acrylic pressure-sensitive adhesive composition, B represents dry weight of insoluble content after depositing acrylic pressure-sensitive adhesive composition in a solvent at ambient temperature for 48 hours, and C represents weight of insoluble content swollen with a solvent after depositing acrylic pressure-sensitive adhesive composition in the solvent at ambient temperature for 48 hours (weight of insoluble content of acrylic pressure-sensitive adhesive composition+weight of permeated solvent).

Advantageous Effects

The present invention relates to an acrylic pressure-sensitive adhesive composition for a polarizing plate, and relates to a pressure-sensitive adhesive composition for a polarizing plate having an excellent low light leakage property, without changing major properties under a high temperature and humidity such as durability and workability, and a polarizing plate and a liquid crystal display device, containing the same.

Therefore, even if said pressure-sensitive adhesive composition is applied to a polarizing plate of liquid crystal display device to use for a long time, the present invention may prevent a light leakage phenomenon by stress concentration.

BEST MODE FOR CARRYING OUT THE INVENTION

The present invention is explained in more detail below.

To improve the light leakage phenomenon, a method of contributing a stress releasing function to the pressure-sensitive adhesive via regulating a plasticizer or a cross-linking structure in a high molecular weight copolymer has been used. However, it is difficult to completely inhibit the light leakage phenomenon of polarizing plate via only stress release. This is because the residual stress in the pressure-sensitive adhesive layer represented by such cross-linked structure cannot be completely removed, because partially cross-linked structure should be introduced into the adhesive to maintain the durability of the pressure-sensitive adhesive for polarizing plates. Therefore, a negative birefringence is present in the pressure-sensitive adhesive layer and the protective film (TAC) of polarizing plate under such residual stress, which is a major cause that cannot improve the light leakage any longer. The present composition for solving the above problem is characterized by incorporating acrylic monomer (acrylic monomer containing an aromatic group) into the pressure-sensitive adhesive layer that shows excellent stress releasing property to offset such negative birefringence.

When such (meth)acrylic acid ester monomer containing an aromatic group is used to optically compensate negative birefringence of pressure-sensitive adhesive and TAC under stress, a large quantity of acrylic monomer containing an aromatic group is needed. However, if the amount of acrylic monomer containing an aromatic group is increased, the pressure-sensitive adhesive has a side effect that its adhesive power is highly increased. This adversely affects re-workability as a major function of the pressure-sensitive adhesive for polarizing plates. In addition, if the amount of acrylic monomer containing an aromatic group is increased, the pressure-sensitive adhesive has the durability lowered. Without theoretically restricted, such loss of durability is because Me (Molecular weight between entanglement) of resulting acrylic polymer is increased due to introduction of aromatic group containing monomer. For strengthening lack of durability according to introduction of acrylic monomer containing an aromatic group, densely cross-linked structure should be introduced. However, the densely cross-linked structure increases the gel content and deteriorates the stress releasing function of adhesive itself. Therefore, to inhibit the light leakage of polarizing plates as much as possible, with maintaining the durability and the reworkability as a major function of the adhesives for polarizing plates, it is necessary to simultaneously introduce the optimal cross-linked structure, with rendering a suitable level of optical compensation.

The present composition for solving the above problem is characterized by providing the optimal cross-linked structure defined by said gel fraction, swelling ratio and weight average molecular weight of sol.

Usually, when the final pressure-sensitive adhesive is regulated to have a low content of gel and the content of solvent penetrated into gel structure (swelling ratio or swelling Index) is greatly increased. The pressure-sensitive adhesive having such cross-linking structure forms a very loose cross-linking structure. Thus, when the stress is applied from the outside, the pressure-sensitive adhesive shows a large magnitude of creep compliance and is easily deformed, so that it may have an excellent stress release property to improve the light leakage phenomenon. However, the pressure-sensitive adhesive has a much deteriorated durability under a high temperature or a high temperature and humidity.

The present inventors have tried to solve such problems. As a result, the present inventors discovered that if the final pressure-sensitive adhesive is designed to have low swelling ratio as well as low gel content, it may have an excellent stress release property and maintain the durability under a high temperature or a high temperature and humidity condition as well and thus accomplished the present invention. Without theoretically limited, if the pressure-sensitive adhesive has both low gel content and low swelling ratio, it forms a relatively dense cross-linking structure. Such cross-linked structures may be linked together with sols (free polymer having uncross-linked structure) of the pressure-sensitive adhesive to simultaneously satisfy the stress release property and the durability. Therefore, it is very important to regulate the cross-linking structures in the present invention. If the cross-linked structures in the pressure-sensitive adhesive with even similar gel content are much denser, the uncross-linked polymer is difficult to penetrate into the space between cross-linked structures, so that the durability is significantly lowered. On the other hand, if the cross-linking structures are loosened, the uncross-linked polymer may be easily penetrated into the space between cross-linked structures, but easily got out from the space on applying force on the pressure-sensitive adhesive, so that the durability is also lowered.

The (meth)acrylic copolymer (A) according to the present invention is exemplified below, comprising (a) 70 to 95 parts by weight of alkyl(meth)acrylic acid ester monomer in which alkyl has 2 to 14 carbon atoms and (b) 5 to 30 parts by weight of (meth)acrylic acid ester monomer containing a copolymerizable aromatic group.

If the amount of said alkyl(meth)acrylic acid ester monomer (a) in which alkyl has 2 to 14 carbon atoms is in excess of 95 parts by weight or the amount of said (meth)acrylic ester monomer containing an aromatic group (b) is less than 5 parts by weight, the final pressure-sensitive adhesive represents a high negative birefringence under the residual stress and thus the effect of improving optical light leakage is poor. In addition, if the amount of said alkyl(meth)acrylic acid ester monomer (a) in which alkyl has 2 to 14 carbon atoms is less than 70 parts by weight or the amount of said (meth)acrylic ester monomer containing an aromatic group (b) is in excess of 30 parts by weight, the adhesion property balance of final pressure-sensitive adhesive is deteriorated, the adhesive represents a high positive birefringence under the residual stress and thus the effect of improving optical light leakage is deteriorated.

Especially, considering the effect of improving the light leakage and the adhesion properties, the weight ratio of alkyl (meth)acrylic acid ester monomer, in which alkyl has 2 to 14 carbon atoms, and (meth)acrylic acid ester monomer containing a copolymerizable aromatic group is, preferably, 3:1 to 6:1, and more preferably, 3.5:1 to 4.5:1.

The alkyl(meth)acrylic acid ester monomer (a) in which alkyl has 2 to 14 carbon atoms, according to the present invention, is a major resin in the pressure-sensitive adhesive and preferably, uses one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

If the carbon number of alkyl is departed from the above range, the glass transition temperature (Tg) of the pressure-sensitive adhesive is increased, or regulation of the adhesive property is difficult. Therefore, the carbon number is limited within a range of 2-14.

The (meth)acrylic acid ester monomer containing a copolymerizable aromatic group (b) according to the present invention uses, preferably, a compound of Formula 1:

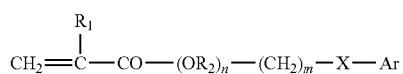  (1)

wherein,
R$_1$ represents hydrogen or a methyl group,
R$_2$ represents an alkylene group having 1 to 12 carbon atoms,
n represents an integer of 0 to 3, preferably, 0 or 1,
m represents an integer of 0 or 1,
X represents an oxygen atom or a sulfur atom, and
Ar represents an aromatic group unsubstituted or substituted with halogen, particularly bromo or chloro, or alkyl of 1 to 12 carbon atoms.

Preferred examples of said compound of Formula 1 include, but not limited to, phenoxy ethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecyl phenyl (meth)acrylate, 2-(1-naphtyloxy)-1-ethyl (meth)acrylate, 2-(2-naphtyloxy)-1-ethyl (meth)acrylate, 6-(1-naphtyloxy)-1-hexyl (meth)acrylate, 6-(2-naphtyloxy)-1-hexyl (meth)acrylate, 8-(1-naphtyloxy)-1-octyl (meth)acrylate, and 8-(2-naphtyloxy)-1-octyl (meth)acrylate. Said compound of Formula 1 may be used alone or in a form of a mixture thereof.

More preferably, said compound of Formula 1 is phenoxy ethyl (meth)acrylate, benzyl (meth)acrylate, 2-phenylthio-1-ethyl (meth)acrylate, 8-(2-naphtyloxy)-1-octyl (meth)acrylate, 2-(1-naphtyloxy)-1-ethyl (meth)acrylate and a mixture thereof; and most preferably, phenoxy ethyl (meth)acrylate, benzyl (meth)acrylate or a mixture thereof.

To regulate the glass transition temperature of the pressure-sensitive adhesive or provide other functionalities, the (meth)acrylic copolymers (A) according to the present invention further, preferably, comprise 0-20 parts by weight of a functional monomer (c) of Formula 2 relative to weight of total monomers as an optional component.

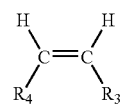  2 wherein,
R$_4$ represents hydrogen or alkyl,
R$_3$ represents cyano, phenyl unsubstituted or substituted with alkyl, acetyloxy, or COR$_5$, where R$_5$ represents amino or glycidyloxy unsubstituted or substituted with alkyl.

In the formula above, alkyl in definitions of R$_3$ to R$_5$ preferably, represents lower alkyl of 1 to 6 carbon atoms, and more preferably, methyl or ethyl.

Examples of said compound of Formula 2 may include, but not limited to, styrene monomers such as styrene or alpha methyl styrene; carboxylic acid vinyl esters such as vinyl acetate; or nitrogen containing monomers such as acrylonitrile, (meth)acryl amide, N-methyl(meth)acryl amide, N-butoxy methyl(meth)acryl amide, or glycidyl(meth)acrylate. Said monomers may be used alone or in a mixture thereof.

If the amount of said functional monomer (c) of Formula 2 is too high, the flexibility and the peel strength of pressure-sensitive adhesive are lowered. Therefore, it is preferred to use less than 20 parts by weight of total monomer components.

Preferably, the (meth)acrylic copolymer (A) further comprises 0.1 to 10 parts by weight of vinyl based or acyl based cross-linkable monomer (d) comprising a cross-linkable functional group relative to weight of total monomers. Said cross-linkable monomer (d) is reacted with a cross-linking agent to provide the pressure-sensitive adhesive with cohesion strength or adhesion strength by chemical bonds, so as not to occur breakdown of its cohesion strength under a high temperature or a high humidity condition.

Preferably, said vinyl or acrylic cross-linkable monomers (d) comprising a cross-linkable functional group use one or more selected from the group consisting of hydroxylalkyl (meth)acrylate, hydroxyalkylene glycol (meth)acrylate, and ethylenically unsaturated carboxylic acid containing one or more carboxylic acids. More preferably, they include, but not limited to, 2-hydroxyethyl (meth)acrylate, 2-hydroxypropyl (meth)acrylate, 4-hydroxybutyl (meth)acrylate, 2-hydroxyethylene glycol (meth)acrylate, 2-hydroxypropylene glycol (meth)acrylate, acrylic acid, methacrylic acid, acrylic acid dimer, itaconic acid, maleic acid, and maleic anhydride. Said monomers may be used alone or in a mixture thereof.

Preferably, said vinyl and/or acrylic cross-linkable monomer comprising a cross-linkable functional group uses in an amount of 0.01 to 10 parts by weight. If the amount is less than 0.01 parts by weight, the breakdown of cohesion is easily occurred and the effect of improving adhesion strength is lowered. If the amount is in excess of 10 parts by weight, compatibility is reduced to develop the surface migration, flow property is reduced, and stress release ability is lowered due to increase of cohesion strength.

When the (meth)acrylic copolymer (A) is cross-linked, the acrylic pressure-sensitive adhesive composition of the present invention may comprises 0.01 to 10 parts by weight of multi-functional cross-linking agent (B) relative to 100 parts by weight of the (meth)acrylic copolymer.

Said multi-functional cross-linking agent (B) is reacted with a carboxylic group and a hydroxyl group, and the like to serve to increase the cohesion strength of pressure-sensitive adhesive Preferably, said multi-functional cross-linking agent is one or more selected from the group consisting of isocyanate compounds, epoxy compounds, aziridine compounds, and metal chelating compounds. Among these, isocyanate compounds is easy to be used for use propose.

Said isocyanate compounds may be one or more selected from the group consisting of tolylene diisocyanate, xylene diisocyanate, diphenylmethane diisocyanate, hexamethylene diisocyanate, isoform diisocyanate, tetramethylxylene diisocyanate, naphthalene diisocyanate, and their reactants with polyol (trimethylolpropane, etc.).

Said epoxy compounds may be one or more selected from the group consisting of ethyleneglycol diglycidylether, triglycidylether, trimethylolpropane triglycidylether, N,N,N'N'-tetraglycidylethylenediamine, and glycerine diglycidylether.

Said aziridine compounds may be one or more selected from the group consisting of N,N'-toluene-2,4-bis(1-aziridinecarboxide), N,N'-diphenylmethane-4,4'-bis(1-aziridinecarboxide), triethylenemelamine, bisisoprothaloyl-1-1-(2-methylaziridine), and tri-1-aziridinylphosphineoxide.

Said metal chelating compounds may use, but not limited to, one or more selected from compounds that a multivalent metal such as aluminum, iron, zinc, tin, antimony, magnesium and vanadium is coordinated with acethylacetone or ethyl acetoacetate.

Preferably, said multi-functional cross-linking agent is used in an amount of 0.01 to 10 parts by weight relative to 100 parts by weight of acrylic copolymers (A). The preferred physical properties according to the present invention may be provided within the ranges above.

The multi-functional cross-linking agent may be evenly coated, when the functional cross-linking reaction of the cross-linking agent is only less occurred in the combining process performed for forming the pressure-sensitive adhesive layer. If the coating process is completed followed by drying and aging, the cross-linked structure may be formed to obtain the pressure-sensitive adhesive layer having elasticity and strong cohesion strength.

In addition, if the present composition is adhered to a glass substrate, it may further comprises a silane coupling agent (C) for improving adhesion stability and thus more improving thermal/moisture resistance. When the glass substrate is left for a long time under a high temperature and humidity, such silane coupling agent serves to be of help to improve adhesion reliability, which may be used in an amount of 0.005 to 5 parts by weight relative to 100 parts by weight of the acrylic copolymer (A). If the amount is less than 0.005 parts by weight, the adhesion reliability is not improved. If the amount is in excess of 5 parts by weight, the endurance reliability is lowered.

The silane coupling compound is γ-glycydoxypropyl trimethoxysilane, γ-glycydoxypropyl methyldiethoxysilane, γ-glycydoxypropyl tri-ethoxysilane, 3-mercaptopropyl trimethoxysilane, vinyl trimethoxysilane, vinyl tri-ethoxysilane, γ-methacryloxypropyl trimethoxysilane, γ-methacryloxypropyl tri-ethoxysilane, γ-aminopropyl triethoxysilane, 3-isocyanatepropyl triethoxysilane, or γ-acetoacetatepropyl trimethoxysilane and the like. These may be used alone or in a mixture thereof.

The present invention may further comprise a tackifier resin (D), which may be used in an amount of 1 to 100 parts by weight relative to 100 parts by weight of the acrylic copolymer (A). If the amount is less than 1 part by weight, the tackifying function is poor. If the amount is in excess of 100 parts by weight, the compatibility or the cohesion strength of pressure-sensitive adhesive is often reduced.

The tackifier resin may use a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like. These may be used alone or by mixing two or more of the above resins.

In addition, for special purposes, an acrylic low molecular weight polymers, an epoxy resin, a hardener, etc. may be additionally mixed and used, and for general purposes, a UV stabilizer, an antioxidant, a colorant, a reinforcing agent, a filler, a defoaming agent, a surfactant, a plasticizer, etc. may be properly added and used.

The acrylic pressure-sensitive adhesive of the present invention has a gel fraction, represented by Equation 1, of 10 to 55%, preferably 15 to 35% and a swelling ratio, represented by Equation 2, of 30 to 110, preferably 50 to 100 and a sol (uncross-linked polymer) eluted therein with a solvent has a weight average molecular weight of 600,000 or more.

$$\text{Gel fraction}(\%) = B/A \times 100 \quad (1)$$

$$\text{Swelling ratio} = C/B \quad (2)$$

wherein,

A represents weight of acrylic pressure-sensitive adhesive composition,

B represents dry weight of insoluble content after depositing acrylic pressure-sensitive adhesive composition in a solvent at ambient temperature for 48 hours, and C represents weight of insoluble content swollen with a solvent after depositing acrylic pressure-sensitive adhesive composition in the solvent at ambient temperature for 48 hours (weight of insoluble content of acrylic pressure-sensitive adhesive composition+weight of permeated solvent).

If the gel fraction of said final pressure-sensitive adhesive is in excess of 55%, the stress release property of the pressure-sensitive adhesive is significantly decreased. If the gel fraction is less than 10%, the endurance reliability under a high temperature and humidity is much deteriorated. At the same time, if the swelling ratio measured by gel is less than 30, the cross-linked structure become so dense to have insufficient stress release property of the pressure-sensitive adhesive. If the swelling ratio is in excess of 110, the cross-linked structure is so loosened to have poor durability.

In addition, the weight average molecular weight of the sol (uncross-linked polymer) eluted from said final pressure-sensitive adhesive is, preferably, 600,000 or more. If the weight average molecular weight is less than 600,000, the endurance reliability is insufficient.

The method for preparing the (meth)acrylic copolymer according to the present invention is not specifically limited, and the (meth)acrylic copolymer can be prepared by solution polymerization, photo-polymerization, bulk polymerization, suspension polymerization, and emulsion polymerization. Preferably, it is prepared by using solution polymerization. The polymerization temperature is preferably 50 to 140° C., and the initiator is preferably added in a state that monomers are evenly mixed.

Such polymerization initiator may use an azo-based polymerization initiator such as azo-bisisobutyronitrile and azo-biscyclohexanecarbonitrile, or a peroxide such as benzoyl peroxide and acetyl peroxide alone or in a mixture thereof.

Meanwhile, said acrylic pressure-sensitive adhesive may be prepared by preparing two individual acrylic polymers, that is, an acrylic polymer for cross-linking structure and an acrylic polymer for non-cross-linking structure, and mixing them in a certain weight ratio, or sequentially preparing two acrylic polymers in a reactor, and then reacting them with a multifunctional cross-linking agent. The acrylic polymer for cross-linking structure contains essentially cross-linkable functional group. If the amount of the cross-linkable functional group is too high, the cross-linking structure is so dense that a polymer having no cross-linking structure is very difficult to penetrate into the space between cross-linking structures. Therefore, the endurance reliability is significantly lowered, so that the gel content and swelling ratio of the present invention cannot be achieved. On the one hand, if the amount of the cross-linkable functional group is less than a certain value, the cross-linking structure becomes too loosen, and the uncross-linked polymer may be easily penetrated into the space between cross-linked structures, but easily got out from the space on applying force on the pressure-sensitive adhesive, so that the endurance reliability is lowered. On the other hand, when the composition of the acrylic polymer for cross-linking structure is very different from that of the acrylic polymer for non-cross-linking structure, the intimate mixing is not so obtained between two polymers that the composition is preferably similar as possible. Also, a cross-linkable functional group is advantageously a hydroxy group, rather than a carboxylic group, in an aspect of mixing two polymers. The acrylic polymer for non-cross-linking structure contains preferably no cross-linkable functional group (hydroxy group or carboxylic group), but it may have cross-linkable functional group.

The present invention relates to a polarizing plate characterized by comprising said acrylic pressure-sensitive adhesive composition as a pressure-sensitive adhesive layer on one side or both sides of the polarizing film.

Polarizing film or polarizing device above is not specifically limited, but uses preferably polarizing film prepared by containing a polarizing component such as iodine or dichroic dye onto polyvinyl alcohol resin film, and elongating the resulting product. The thickness of said polarizing film is also not specifically limited, and may form usual thickness. Said polyvinyl alcohol resin may use polyvinyl alcohol, polyvinyl formal, polyvinyl acetal and ethylene, saponified vinyl acetate copolymer, and the like.

On both sides of the polarizing film, multilayer films may be formed, on which a protective film is laminated, such as a cellulose film, for example, triacetyl cellulose, etc.; a polyester film, for example a polycarbonate film, a polyethylene terephthalate, etc.; a polyether sulphone film; a polyolefin film, for example, polyethylene, polypropylene, polyolefine having cyclo or norbornene structure, or a polyolefin film, for example, ethylene propylene copolymer. The thickness of these protective films is not specifically limited, and may form usual thickness.

The method of forming the pressure-sensitive adhesive layer on a polarizing film is not specifically limited in the present invention, which may be applied by a method of coating the pressure-sensitive adhesive directly on the surface of a polarizing film, using Bar Coater and the like, and drying the adhesive, or a method of coating the pressure-sensitive adhesive on the surface of releasable substrate, drying the adhesive, transferring the pressure-sensitive adhesive layer formed on the surface of releasable substrate to the surface of polarizing film, and aging the layer.

In addition, on the polarizing plate of the present invention may be laminated one or more layers providing additional functions, such as protective layer, reflecting layer, anti-glare layer, phase retardation plate, compensation film for wide view angle, and brightness enhancing film.

The polarizing plate applied by the pressure-sensitive adhesive of the present invention can be applied to all usual liquid crystal display devices, the kind of which liquid crystal panel is not specifically limited. Preferably, the present invention may construct liquid crystal display devices comprising a liquid crystal panel binding the pressure-sensitive adhesive polarizing plate to one side or both sides of a liquid crystal cell.

The present invention is explained in more detail through examples and comparative examples below. The examples are provided to help the specific understanding of the present invention, but the scope of the present invention is not restricted to these examples.

Preparation Example 1

To 1 L reactor equipped with a cooling system for reflux of nitrogen gas and easy regulation of temperature was added a mixture of monomers consisting of 83 parts by weight of n-butylacrylate (BA), 2.0 parts by weight of hydroxymethacrylate, and 15 parts by weight of benzyl acrylate, as the composition represented in Table 1 below. Then, 150 parts by weight of ethyl acetate (EAc) was added thereto as a solvent. To remove oxygen, nitrogen gas was purged for 60 minutes, and the temperature was kept at 60° C. 0.03 parts by weight of azobisisobutyronitrile (AIBN), a reaction initiator, was added thereto and reacted for 8 hours. After the reaction, the resulting product was diluted with ethyl acetate (EAc) to prepare an acrylic copolymer (A-1) having a solid content of 20% by weight, a weight average molecular weight of 1,200,000, and a molecular weight distribution of 4.9.

Preparation Examples 2 to 8

As shown in Table 1 below, high molecular weight acrylic copolymers were prepared by the same method as Preparation Example 1 except that some of components were not added or partially added.

TABLE 1

|  |  | Preparation Example | | | | | | | |
|---|---|---|---|---|---|---|---|---|---|
|  |  | 1 | 2 | 3 | 4 | 5 | 6 | 7 | 8 |
| Composition of | n-BA | 83 | 80 | 58 | 95 | 98 | 80 | 80 | 100 |
| Copolymers (parts | BzA | 20 |  | 40 | 3 | 0 | 0 | 0 | 0 |
| by weight) | PEA |  | 20 |  |  | 0 | 20 | 20 | 0 |
|  | 2-HEMA | 2 | 2 | 2 | 2 | 2 | 0 | 0 | 0 |
|  | AIBN | 0.03 | 0.03 | 0.03 | 0.03 | 0.03 | 0.03 | 0.1 | 0.03 |
|  | EAc | 120 | 120 | 150 | 150 | 120 | 150 | 200 | 120 |
| Mw (10,000) |  | 150 | 150 | 120 | 130 | 160 | 115 | 80 | 150 |
| Molecular Weight Distribution |  | 4.9 | 5.5 | 5.4 | 4.8 | 3.8 | 5.1 | 5.3 | 4.1 | n-BA: n-butylacrylae,
BzA: benzylacrylate,
PEA: phenoxyethylacrylate,
2-HEMA: 2-hydroxyethylmethacrylate,
AIBN: azobisisobutyronitrile,
EAc: ethylacetate Example 1

Combination Process 20 parts by weight of the obtained high molecular weight acrylic sytem in Preparation Example 1 and 80 parts by weight of the obtained high molecular weight acrylic sytem in Preparation Example 6 were homogenously mixed and 0.1 parts by weight of tolulene diisocyanate adduct of trimethylolpropane (TDI-1) and 0.1 parts by weight of -glycidoxypropyltrimethoxysilane as a multi-functional cross-linking agent were added. The mixture was diluted in a suitable concentration and homogeneously mixed, considering the coating property. The resulting product was coated on a releasing sheet and dried to obtain a 30 micron homogenous pressure-sensitive adhesive layer.

<Laminating Process>

The prepared pressure-sensitive adhesive layer above was subjected to adhesion to a iodine polarizing plate with a thickness of 185 microns. The resulting polarizing plate was cut into proper sizes and evaluated. The results evaluated for the polarizing plate on which the pressure-sensitive adhesive was applied were represented in Table 2 below.

Examples 2-3

Acrylic copolymers were subjected to combination and evaluation by the same method as Example 1 except that some were not combined or partially combined, based on combinations in Example 1, as combination ratios in Table 2 below. The results evaluated for the polarizing plate on which the pressure-sensitive adhesive was applied were represented in Table 2 below.

Comparative Examples 3-7

Acrylic copolymers were subjected to combination and evaluation by the same method as Example 1 except that some were not combined or partially combined, based on combinations in Example 1, as combination ratios in Table 2 below. The results evaluated for the polarizing plate on which the pressure-sensitive adhesive was applied were represented in Table 2 below.

Experimental Example

Adhesion strength

The polarizing plate coated with the pressure-sensitive adhesive was cut into 25 mm wide and 100 mm long, and then adhered to an alkali-free plate glass by Corning, Inc. using a laminator. Then, after standing the plate glass in the Temperature and Humidity Room Chamber for 1 hour, its release adhesive strength (dyne/25 mm) was measured at a release angle of 180 and a release speed of 300 mm/minute.

Re-Workability

The polarizing plate coated with the pressure-sensitive adhesive was cut into 90 mm wide and 170 mm long, and then adhered to an alkali-free plate glass by Corning, Inc. using a laminator. Then, the plate glass was left in the Temperature and Humidity Room Chamber for 1 hour, heated at 50° C. for 4 hours and left at room temperature for 1 hour, followed by releasing the polarizing plate from the glass. The re-workability was evaluated as follows:

○: easily released

Δ: released with difficulty x: released with difficulty as much as the substrate or the glass was broken Durability The polarizing plate (90 min×170 mm) coated with the pressure-sensitive adhesive was attached to both sides of a glass substrate (110 mm×190 mm×0.7 mm) with each optical absorbing axis crossed. The glass substrate was subjected to a clean room work at the applied pressure of about 5 kg/□ so that bubbles or impurities might not be generated. In order to know moisture-heat resistance of the specimens, they were left at a temperature of 80° C. and a relative humidity of 90% for 1000 hours and then observed about formation of bubbles or releases. Also, in order to evaluate their heat-resistance, they were left at 80° C. for 1000 hours and then observed about formation of bubbles or releases. The specimens were left at room temperature for 24 hours immediately before evaluating their states. Also, the prepared pressure-sensitive adhesive polarizing plates above were left for 5 or more months and then the reliability was evaluated in accordance with the above method. The evaluation standard of endurance reliability was as follows:

○: No bubble or release phenomenon was observed.

Δ: a few bubbles or release phenomenon was occurred.

x: a large quantity of bubbles or release phenomenon was occurred.

Uniformity of Light Transmission (Light Leakage)

To investigate uniformity of light transmission, the glass substrates were observed about whether light was leaked in a dark room using a backlight. To remove the effect by polarizing devices, the following method was adapted: the pressure-sensitive adhesive layer was coated between two sheets of glass substrates (210 mm×210 mm×0.7 mm), a certain stress (5×10$^{+4}$ Pa) was added thereto, polarizing plates (200 mm×200 mm) were adhered to both sides of the coated glass substrates, with them crossed at 90 degree and then observed. Uniformity of light transmission was evaluated by the following standard:

◎: Non-uniformity phenomenon of light transmission was difficultly determined by the naked eye.

○: A few non-uniformity phenomenon of light transmission was present.

Δ: Some non-uniformity phenomenon of light transmission was present.

×: A large quantity of non-uniformity phenomenon of light transmission was present.

Birefringence Measurement of Pressure-Sensitive Adhesive

The specimen that a pressure-sensitive adhesive with a thickness of 25 mm was adhered between two sheets of glass substrates in a size of 1 cm×2 cm was left in Temperature and Humidity Room Chamber (23° C., 60% RH) for 1 day. With one side glass substrate of the specimen fixed and the other side glass substrate applied by a shear stress in a range of 4.0×10$^{+4}$ Pa~7.5×10$^{+4}$ Pa, the birefringence occurred in the pressure-sensitive adhesive was measured. White light of tungsten halogen with a wavelength of 360 to 2000 nm was utilized as the light source used on measuring birefringence.

matic acrylic ester monomer was added in a low amount, so that the effect of improving light leakage was slight.

INDUSTRIAL APPLICABILITY

The present invention relates to an acrylic pressure-sensitive adhesive composition for a polarizing plate, and relates to a pressure-sensitive adhesive composition for a polarizing plate having an excellent low light leakage property, without changing major properties under a high temperature and humidity such as durability and workability, and a polarizing plate and a liquid crystal display device, containing the same.

Therefore, even if said pressure-sensitive adhesive composition is applied to a polarizing plate of liquid crystal display device to use for a long time, the present invention may prevent a light leakage phenomenon by stress concentration.

The present invention is explained in detail, with reference to the described embodiments above. It is evident to one skilled in the art that various modifications and variations are allowed within the scope and the technical spirit of the present invention. Such modifications and variations should be pertained to the attached claims.

What is claimed is:

1. An acrylic pressure-sensitive adhesive composition which comprises a (meth)acrylic copolymer comprising 70 to 95 parts by weight of an alkyl(meth)acrylic acid ester monomer, in which alkyl has 2 to 14 carbon atoms, and 5 to 30 parts by weight of a copolymerizable (meth)acrylic acid ester monomer containing an aromatic group;

wherein the composition forms a crosslinking structure through the reaction of the (meth)acrylic copolymer and a multi-functional crosslinking agent, wherein the composition after forming the crosslinking structure has a gel fraction, represented by Equation 1, of 10 to 55% and a swelling ratio, represented by Equation 2, of 30 to 110, and wherein the composition after forming the crosslinking structure comprises a sol that is capable of being eluted with a solvent from the composition after forming the

TABLE 2

|  |  | Example | | | Comparative Example | | | | | | |
|---|---|---|---|---|---|---|---|---|---|---|---|
|  |  | 1 | 2 | 3 | 1 | 2 | 3 | 4 | 5 | 6 | 7 |
| COMPOSTION* | Preparation Example 1 | 20 | 15 |  | 50 | 20 | 100 |  |  |  |  |
|  | Preparation Example 2 |  |  | 25 |  |  |  | 100 |  |  |  |
|  | Preparation Example 3 |  |  |  |  |  |  |  | 100 |  |  |
|  | Preparation Example 4 |  |  |  |  |  |  |  |  | 100 |  |
|  | Preparation Example 5 |  |  |  |  |  |  |  |  |  | 20 |
|  | Preparation Example 6 | 80 | 85 | 75 | 50 |  |  |  |  |  |  |
|  | Preparation Example 7 |  |  |  |  | 80 |  |  |  |  |  |
|  | Preparation Example 8 |  |  |  |  |  |  |  |  |  | 80 |
|  | Cross-linking agent | 0.1 | 0.1 | 0.1 | 0.1 | 0.1 | 0.1 | 0.1 | 0.1 | 0.1 | 0.1 |
| Gel content (%) |  | 22 | 17 | 28 | 57 | 20 | 67 | 70 | 72 | 65 | 20 |
| Swelling ratio |  | 85 | 95 | 82 | 46 | 100 | 35 | 35 | 30 | 45 | 94 |
| Molecular weight of Sol (10,000) |  | 115 | 120 | 110 | 95 | 55 | 81 | 73 | 65 | 71 | 118 |
| Adhesive birefringence at shear stress of 5.0 × 10$^4$ Pa (×10$^{-5}$) |  | 5 | 5 | 5 | 7 | 5 | 8 | 8 | 16 | −12 | −16 |
| Adhesion strength |  | 600 | 550 | 650 | 450 | 700 | 500 | 530 | 1200 | 400 | 550 |
| Re-workability |  | ○ | ○ | ○ | ○ | ○ | ○ | ○ | X | ○ | ○ |
| Durability |  | ○ | ○ | ○ | ○ | X | ○ | ○ | Δ | ○ | ○ |
| Light leakage |  | ◎ | ◎ | ◎ | Δ | ◎ | Δ | Δ | ◎ | X | Δ |

*Combination composition (parts by weight)

As shown in the results of Table 2, Examples 1 to 3 of the present invention represented an excellent durability and re-workability, and represented an excellent low light leakage property, despite low addition amount of the aromatic acrylic ester monomers.

On the other hand, in case of Comparative Examples 1, 3 and 4, gel contents were departed from the scope of the present invention, so that the stress release property was highly lowered and positive birefringence values were represented. Nevertheless, low light leakage property was deteriorated. In case of Comparative Example 2, low light leakage property was excellent. However, the molecular weight of Sol was so low that the durability was insufficient. In case of Comparative Example 5, a large quantity of aromatic acrylic ester was contained, so that low light leakage property was very excellent. However, re-workability and durability were deteriorated. In case of Comparative Examples 6 and 7, arocrosslinking structure and that has a weight average molecular weight of 600,000 or more:

Gel fraction(%)=B/A×100　　(1)

Swelling ratio=C/B　　(2)

wherein, A represents weight of the composition after forming the crosslinking structure, B represents dry weight of insoluble content after depositing the composition after forming the crosslinking structure in a solvent at ambient temperature for 48 hours, and C represents weight of insoluble content swollen with a solvent after depositing the composition after forming the crosslinking structure in the solvent at ambient temperature for 48 hours.

2. The acrylic pressure-sensitive adhesive composition of claim 1, wherein the weight ratio of alkyl(meth)acrylic acid ester monomer, in which alkyl has 2 to 14 carbon atoms, and copolymerizable (meth)acrylic acid ester monomer containing an aromatic group is 3:1 to 6:1.

3. The acrylic pressure-sensitive adhesive composition of claim 1, wherein the composition after forming the crosslinking structure has the gel fraction, represented by Equation 1, of 15 to 35% and the swelling ratio, represented by Equation 2, of 50 to 100.

4. The acrylic pressure-sensitive adhesive composition of claim 1, wherein the alkyl(meth)acrylic acid ester monomer is one or more selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

5. The acrylic pressure-sensitive adhesive composition of claim 1, wherein the copolymerizable (meth)acrylic acid ester monomer containing an aromatic group is a compound of Formula 1:

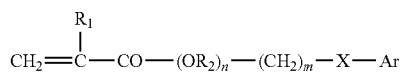

wherein,
$R_1$ represents hydrogen or a methyl group,
$R_2$ represents an alkylene group having 1 to 12 carbon atoms,
n represents an integer of 0 to 3,
m represents an integer of 0 to 1,
X represents an oxygen atom or a sulfur atom, and
Ar represents an aromatic group unsubstituted or substituted with halogen, particularly bromo or chloro, or alkyl of 1 to 12 carbon atoms.

6. The acrylic pressure-sensitive adhesive composition of claim 5, wherein said compound of Formula 1 is one or more selected from the group consisting of phenoxy ethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecyl phenyl (meth)acrylate, 2-(1-naphtyloxy)-1-ethyl (meth)acrylate, 2-(2-naphtyloxy)-1-ethyl (meth)acrylate, 6-(1-naphtyloxy)-1-hexyl (meth)acrylate, 6-(2-naphtyloxy)-1-hexyl (meth)acrylate, 8-(1-naphtyloxy)-1-octyl (meth)acrylate, and 8-(2-naphtyloxy)-1-octyl (meth)acrylate.

7. The acrylic pressure-sensitive adhesive composition of claim 1, wherein the (meth)acrylic copolymers further comprise 0-20 parts by weight of a functional monomer of Formula 2 relative to weight of total monomers:

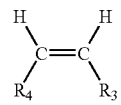

wherein,
$R_4$ represents hydrogen or alkyl,
$R_3$ represents cyano, phenyl unsubstituted or substituted with alkyl, acetyloxy, or $COR_5$, where $R_5$ represents amino or glycidyloxy unsubstituted or substituted with alkyl.

8. The acrylic pressure-sensitive adhesive composition of claim 7, wherein said compound of Formula 2 is one or more selected from the group consisting of acrylonitrile, (meth)acryl amide, N-methyl(meth)acryl amide, N-butoxy methyl (meth)acryl amide, styren, methylstyren, glycidyl(meth)acrylate and vinyl acetate.

9. The acrylic pressure-sensitive adhesive composition of claim 1, wherein the (meth)acrylic copolymers further comprises 0.1 to 10 parts by weight of vinyl based and/or acyl based cross-linkable monomer comprising a cross-linkable functional group relative to weight of total monomers.

10. The acrylic pressure-sensitive adhesive composition of claim 9, wherein the cross-linkable monomer is one or more selected from the group consisting of 2-hydroxyethyl (meth)acrylate, 2-hydroxypropyl (meth)acrylate, 4-hydroxybutyl (meth)acrylate, 2-hydroxyethylene glycol (meth)acrylate, 2-hydroxypropylene glycol (meth)acrylate, acrylic acid, methacrylic acid, acrylic acid dimer, itaconic acid, maleic acid, and maleic anhydride.

11. The acrylic pressure-sensitive adhesive composition of claim 1, wherein the composition comprises 0.01 to 10 parts by weight of multi-functional cross-linking agent relative to 100 parts by weight of the (meth)acrylic copolymer.

12. The acrylic pressure-sensitive adhesive composition of claim 11, wherein the multi-functional cross-linking agent is one or more selected from the group consisting of isocyanate compounds, epoxy compounds, aziridine compounds, and metal chelating compounds.

13. The acrylic pressure-sensitive adhesive composition of claim 1, wherein the composition comprises one or more silane coupling agents selected from the group consisting of γ-glycycloxypropyl trimethoxysilane, γ-glycycloxypropyl methyldiethoxysilane, γ-glycycloxypropyl tri-ethoxysilane, 3-mercaptopropyl trimethoxysilane, vinyl trimethoxysilane, vinyl tri-ethoxysilane, γ-methacryloxypropyl trimethoxysilane, γ-methacryloxypropyl tri-ethoxysilane, γ-aminopropyl triethoxysilane, 3-isocyanatepropyl triethoxysilane, and γ-acetoacetatepropyl trimethoxysilane in an amount of 0.005 to 5 parts by weight relative to 100 parts by weight of acrylic copolymer.

14. The acrylic pressure-sensitive adhesive composition of claim 1, wherein the composition comprises one or more tackifier resins selected from the group consisting of a hydrocarbon resin, a hydrogenated hydrocarbon resin, a rosin resin, a hydrogenated rosin resin, a rosin ester resin, a hydrogenated rosin ester resin, a terpene resin, a hydrogenated terpene resin, a terpene phenol resin, a hydrogenated terpene phenol resin, a polymerized rosin resin, and a polymerized rosin ester resin in an amount of 1 to 100 parts by weight relative to 100 parts by weight of acrylic copolymer.

15. A polarizing plate characterized by comprising the acrylic pressure-sensitive adhesive composition according to claim 1 as a pressure-sensitive adhesive layer on one side or both sides of a polarizing film.

16. The polarizing plate of claim 15, further comprising one or more layers selected from the group consisting of a protective layer, a reflective layer, a phase retardation plate, a compensation film for wide view angle and a brightness enhancing film.

17. A liquid crystal display device comprising a liquid crystal panel binding the pressure-sensitive adhesive polarizing plate according to claim 15 to one side or both sides of a liquid crystal cell.

* * * * *